United States Patent
Martin et al.

[11] Patent Number: 6,150,944
[45] Date of Patent: Nov. 21, 2000

[54] TERMITE DETECTION APPARATUS

[75] Inventors: David Martin, Metairie, La.; Eric Tober, Alexandria, Va.

[73] Assignee: Relative Solutions Corporation, Metairie, La.

[21] Appl. No.: 09/354,415

[22] Filed: Jul. 15, 1999

[51] Int. Cl.[7] .................................................. G08B 17/10
[52] U.S. Cl. ..................... 340/632; 340/573.1; 43/124; 73/23.2
[58] Field of Search ................................ 340/632, 573.1; 43/124, 132.1; 73/23.2

[56] References Cited

U.S. PATENT DOCUMENTS

| | | | |
|---|---|---|---|
| 3,943,750 | 3/1976 | McLaughlin | 73/23 |
| 4,937,555 | 6/1990 | Litzkow et al. | 340/540 |
| 4,941,356 | 7/1990 | Pallaske | 73/587 |
| 5,005,416 | 4/1991 | Vick et al. | 73/587 |
| 5,024,832 | 6/1991 | Omata et al. | 424/84 |
| 5,285,688 | 2/1994 | Robbins et al. | 73/587 |
| 5,329,726 | 7/1994 | Thorne et al. | 43/124 |
| 5,429,727 | 7/1995 | Vogt et al. | 204/153.14 |
| 5,555,672 | 9/1996 | Thorne et al. | 43/124 |
| 5,571,967 | 11/1996 | Tanaka et al. | 73/587 |
| 5,575,105 | 11/1996 | Otomo | 43/132.1 |
| 5,592,774 | 1/1997 | Galyon | 43/124 |
| 5,772,863 | 6/1998 | Shoemaker et al. | 204/426 |
| 5,832,658 | 11/1998 | Randon | 43/131 |
| 5,874,097 | 2/1999 | Henderson et al. | 424/405 |

*Primary Examiner*—Edward Lefkowitz
*Attorney, Agent, or Firm*—Roy, Kiesel & Tucker

[57] ABSTRACT

A termite detection system is disclosed herein. The system comprises a sensor and associated microprocessor detect the presence of gases emitted by termites. The processor relays a signal to an appropriate output device to alert a user that the system has detected the presence of termites.

17 Claims, 4 Drawing Sheets

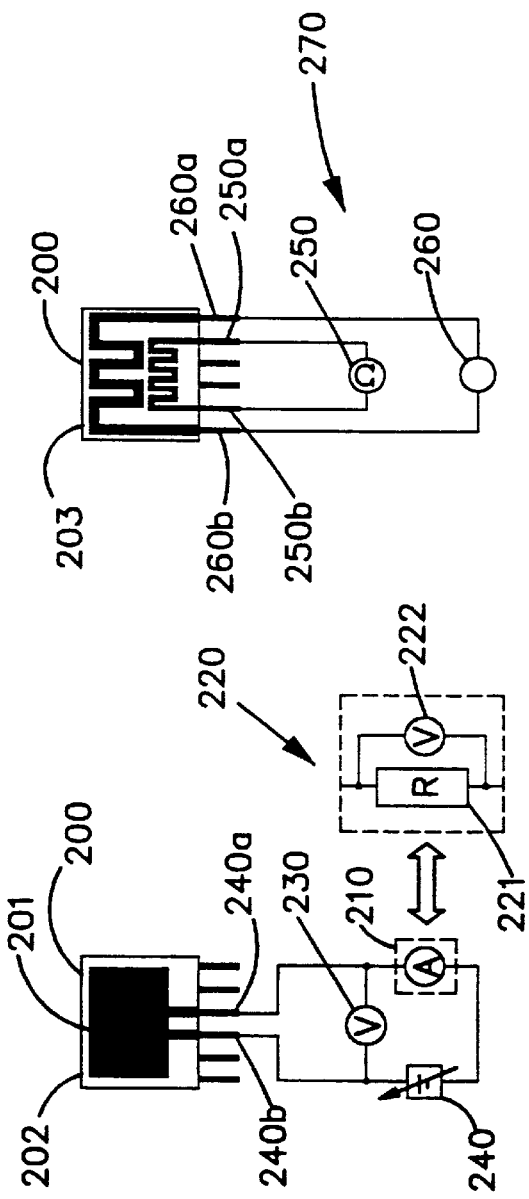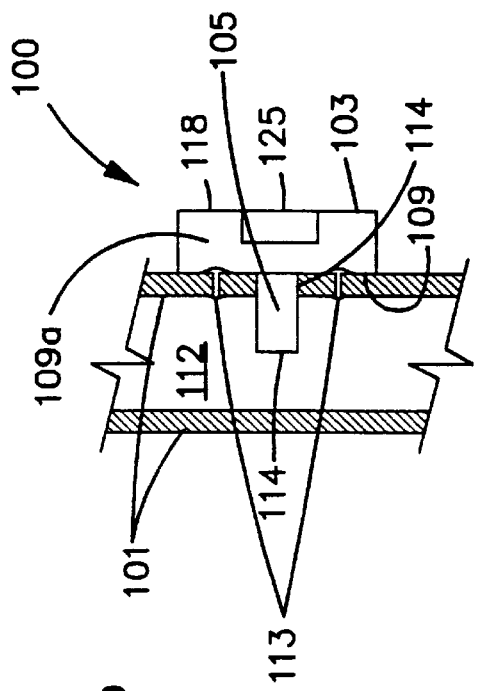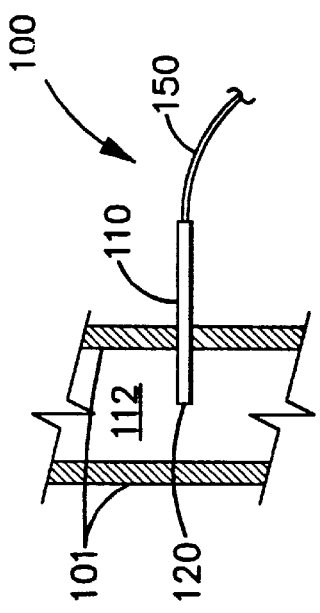
FIGURE 4b
FIGURE 2b
FIGURE 2a
FIGURE 4a

TERMITE DETECTION APPARATUS

BACKGROUND OF THE INVENTION

1. Field of the Invention

This invention relates to termite detection, namely an apparatus and method for detecting the presence of termites to prevent infestation of termites within structures.

2. Prior Art

There are a variety of methods and apparatuses currently used to detect and control termites. However, prior art apparatuses and methods are inefficient, ineffective or unfeasible from an economic standpoint. Detection is the linchpin in the control of termites. It is widely accepted that there exists a lack of reliable detection technologies. Although several apparatuses and methods (including listening devices, moisture meters, and trained dogs) have been developed, none of these apparatuses or methods have proven to be more successful than the traditional visual inspection by a trained pest control operator. Unfortunately, visual inspections themselves are not highly reliable and often miss significant hidden infestations. With incomplete inspections standing as the primary reason for callbacks in the termite control industry, it is clear that a need exists for a reliable and inexpensive detection device and method.

ADVANTAGES AND OBJECTS OF THE INVENTION

The present invention has several advantages over the prior art. First, the apparatus and method of the present invention monitor termite gas emissions and detect infestations that are not visible to pest control operators. Second, the present invention detects termites easily and inexpensively without significant intrusion into the walls of an existing structure, such as a house or other dwelling. Third, the present invention can be positioned and left alone. When the apparatus detects termite gases, the invention alerts a user that termites may be present. Finally, the present invention is inexpensive to manufacture. The savings in costs are passed on to consumers, making the termite detection device of the present invention a worthwhile investment for homes having the potential of termite infestations.

With the aforementioned considerations in mind, it is therefore an object of this invention to provide a termite detection device that can detect termite infestations that are invisible to visual inspections.

It is a further object of the present invention to provide a safe and effective termite detection device that is free of toxic bait materials.

It is a further object of the present invention to provide a detection device that avoids any significant intrusion into the walls of existing dwellings.

It is a further object of the present invention to provide a detection device that can be easily positioned in existing dwellings to alert users when termites are present.

These and other advantages and objects of this invention shall become apparent from the ensuing description of the invention.

SUMMARY OF THE INVENTION

A termite detection invention is disclosed herein. The invention comprises a sensor adapted to be in fluid communication with and positionable within an area infestable by termites. The sensor is responsive to gases and/or combinations of gases emitted by termites and produces an output responsive to the presence of gases that contact a reactive area of the sensor. The sensor operatively communicates with a processor.

The invention also comprises a processor operatively communicating with the sensor. The processor compares the output of the sensor to an existing output of one or more gases (or combinations thereof) known to be emitted by termites to determine if termites are present. The invention also comprises an output device operatively communicating with the processor. The output device generates an alert signal to a user when the processor detects the presence of one or more gases known to be emitted by termites. The sensor is adapted to be positionable within the wall of an existing structure and adapted to be in fluid communication with the open space of a wall of an existing structure.

The invention herein also comprises a method for detecting the presence of termites. The method comprises the steps of providing a termite detection apparatus comprising a sensor positionable in an area infestable by termites. The sensor has a reactive area responsive to gases that contact it. The method also comprises the steps of passing an electrical current through the reactive area of the sensor; generating a response from the sensor; comparing the response to a response of gas(es) known to be emitted by termites; and, outputting the results of the comparison to a user.

BRIEF DESCRIPTION OF THE DRAWINGS

FIG. 2a illustrates a view of a first side of the sensor of the present invention.

FIG. 2b illustrates a view of a second side of the sensor of the present invention.

FIG. 4a illustrates the embodiment of the invention shown in FIG. 3a with the wand positioned within a wall.

FIG. 4b illustrates the embodiment of the invention shown in FIG. 3b with the wand positioned within a wall.

DETAILED DESCRIPTION OF THE INVENTION

Illustrations of construction, design, and methods of operation of the invention are set forth below with specific references to the Figure. However, it is not the intention of the inventor that the scope of his invention be limited to these embodiments.

Figure 1:
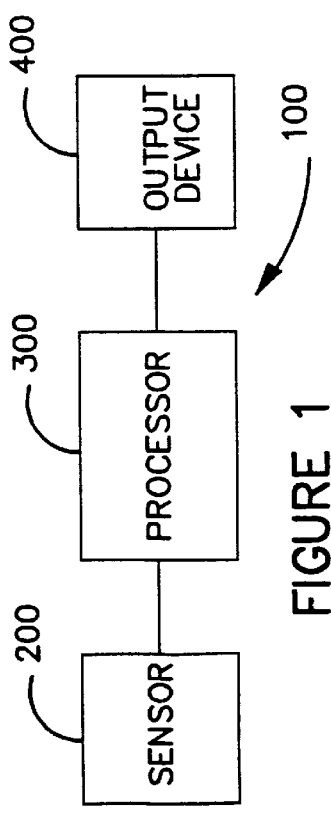
FIG. 1 illustrates a block diagram showing a general configuration of the present invention.

As shown in FIG. 1, termite detection apparatus 100 generally comprises, in block diagram form, an output device 400, a processor 300, and a sensor 200 that can detect the presence of termite-emitted gases. Prior publications indicate that these gases may include naphthalene, δ-3-carene, 2,3,7-trimethyloctane, 2,6,10-trimethyldodecane, elemene, α-longipene, aristolene, calarene, β-guaiene, N-(1-methylhexylidene)-methylamine, 2,6,10,14-tetramethylpentadecane, α-muurolene, fenchone, and combinations thereof. Sensor 200 is in electronic communication with an analyzer, or processor 300, that processes the electrical signals generated and relayed by sensor 200 to determine if sensor 200 has detected the presence of termite gases. Processor 300 relays an appropriate output signal to output device 400 to alert a user of the device whether or not termite gases have been detected. As used herein, gases or termite gases shall include single gases or combinations of two or more gases.

Figure 5:
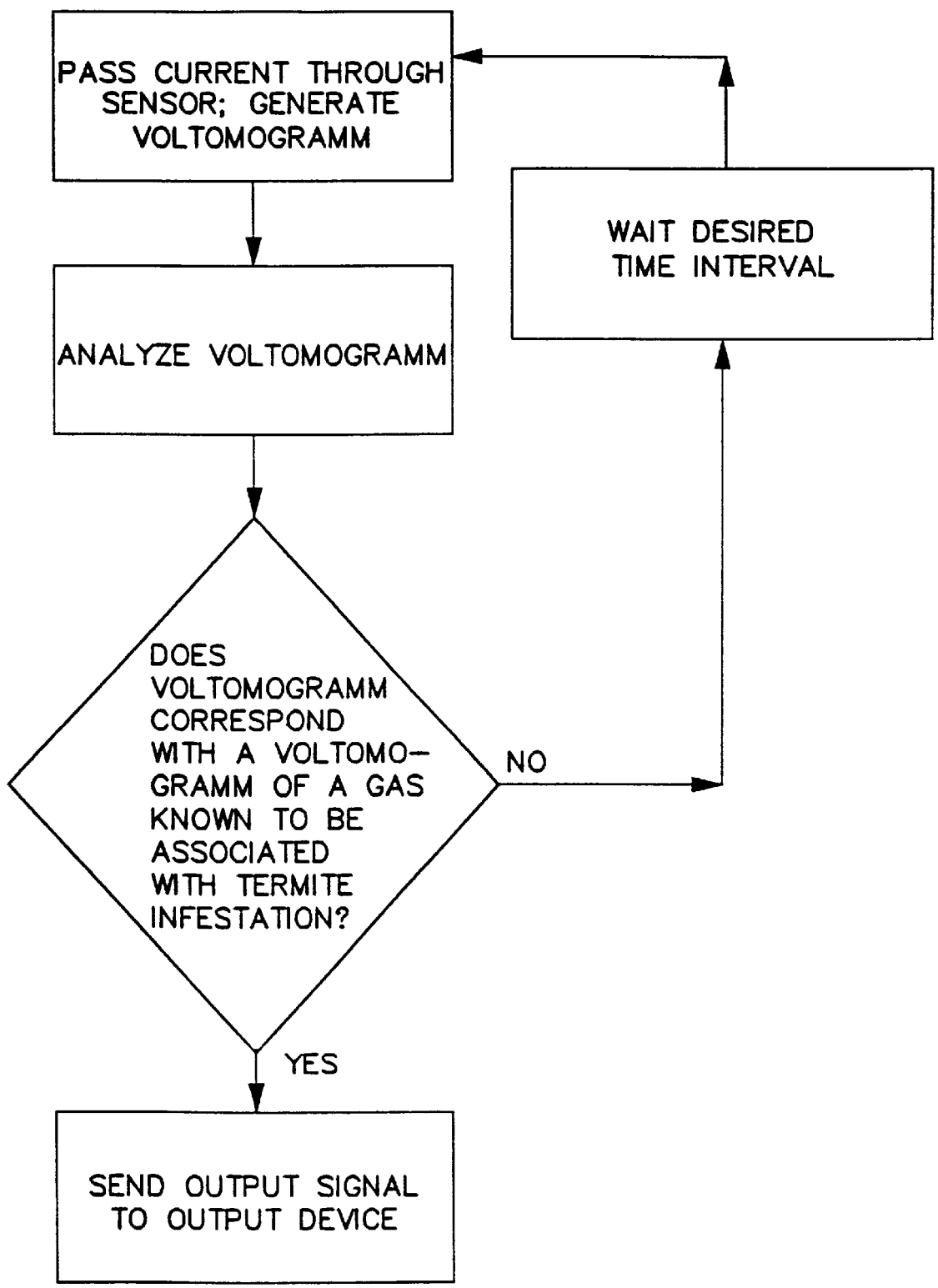
FIG. 5 illustrates a decision tree for the present invention.

FIG. 5 illustrates a decision tree for the present invention. First, processor 300, in connection with suitable software, instructs the sensor power source to pass current through sensor 200 to generate a resulting response referred to as a voltomogramm herein. The voltomogramm is then compared to existing voltomogramms of known gases or combinations thereof, which have been programmed into processor 300. If the voltomogramm corresponds to a voltomogramm of a gas or combination of gases known to be associated with termite infestations, then an appropriate signal is sent to output device 400 so that an alert signal can be generated for the user. If termite gases are not detected, a desired time interval passes, and the process is repeated.

Sensor 200 is preferably an electrocatalytic cermet gas sensor, such as that disclosed in U.S. Pat. Nos. 5,429,727 and 5,772,863 which are incorporated in their entirety by reference. Suitable sensors 200 are available from Argonne National Laboratories ("ANL") in Argonne, Ill.

Sensors 200 are shown FIGS. 2a and 2b. Sensors 200 comprise a reactive surface area 201 positioned on a first side 202 of sensor 200. A sensor temperature control device 270 is positioned on an opposite side 203 of sensor 200. Sides 202, 203 are preferably electrically insulated from each other. Temperature control device 270 comprises a variable power source 260, such as an adjustable 1.0 amp @ 5.0 volt direct current power supply connected to sensor leads 260a, 260b. Temperature control device 270 also comprises an ohmeter 250 between leads 250a, 250b. Ohmeter 250 is used to determine the temperature of sensor 200 during operation.

The sensor temperature is measured so that: (a) the reactive area 201 of sensor 200 is heated to a desired operating temperature (>200° C.), and (b) temperature corrections, if needed, can be made to the corresponding measurements taken by voltmeter 230 and ammeter 210 or 220.

Processor 300 generally comprises a computer, meter, or other suitable device for processing the electronic signal from sensor 200. Suitable communication interfaces, including remote interfaces, between sensor 200 and processor 300 may be used to electronically connect them. Processor 300 is programmed with suitable software for processing the sensor signals and outputting an appropriate indicator to indicate if termite gases are present as noted Columns 7, line 58 through Column 8 line 23 of U.S. Pat. No. 5,429,727 already incorporated herein by reference.

Preferred software used to measure the voltomogramms of the gases contacting reactive area 201 of sensor 200 is Data Acquisition and Analysis ($DA^2$) Software, available from Pondscum, Inc. of North Aurora, Ill.

Figure 6:
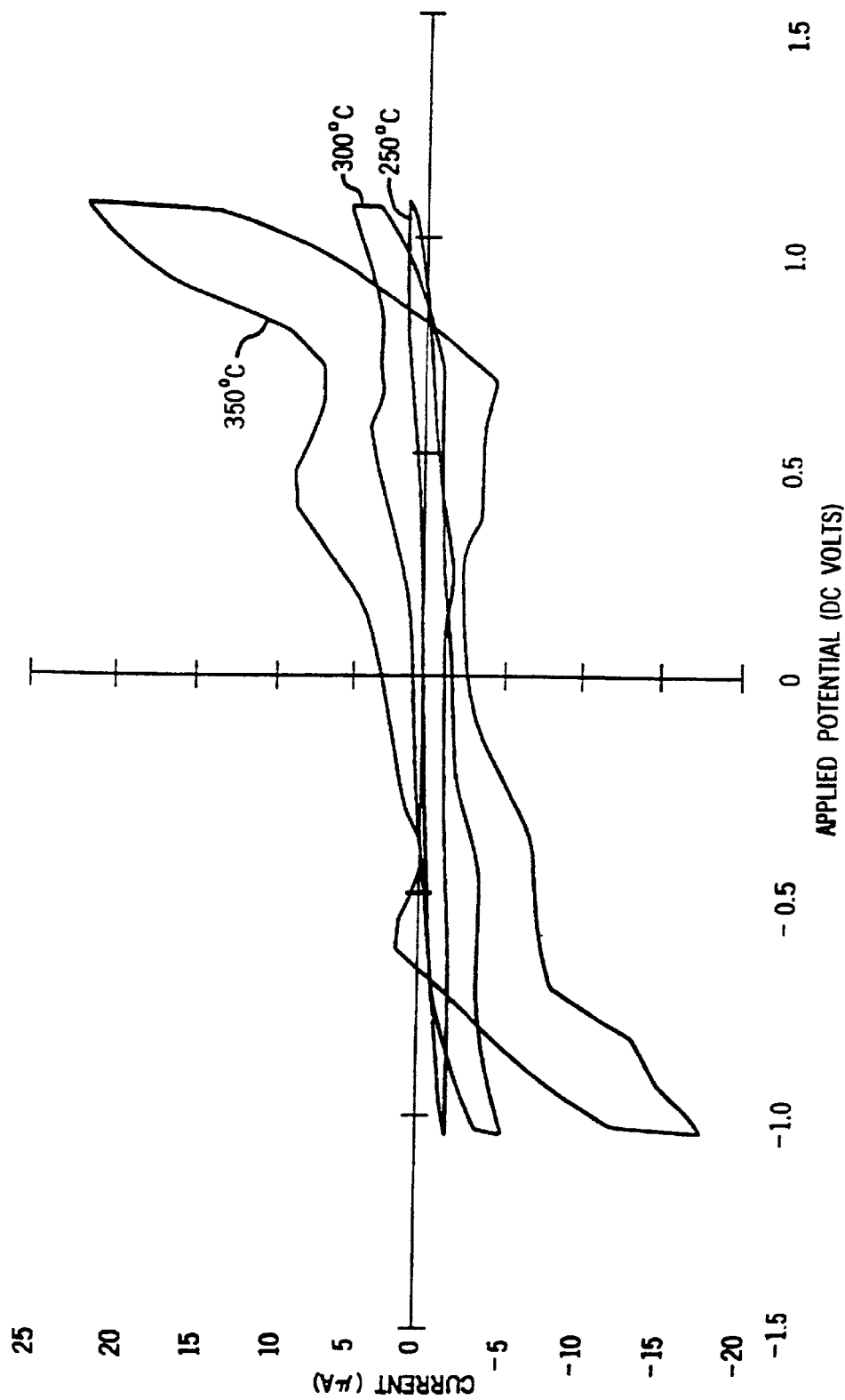
FIG. 6 illustrates an example of a voltomogramm that may be generated by a sensor used in connection with the present invention.

In embodiments where processor 300 comprises a computer, the $DA^2$ software instructs the computer to send a signal from processor 300, via a pmcia card, or other suitable connection means, to a variable power source 240 of sensor 200 shown in FIG. 2a. Responding to instructions from the software, variable power source 240 varies the electrical signal between about −1.0 and about +1.0 volts across the reactive area 201 of sensor 200. The voltage potential across reactive area 201, measured by voltmeter 230, causes the gases contacting the surface of reactive area 201 to react therewith. As these chemical reactions occur, the resistivity of reactive area 201 will vary, causing the current passing through reactive area 201 to also vary (current=voltage/resistance). The change in current is measured by ammeter 210 and plotted against the applied voltage measured by voltmeter 230. The resulting plot, herein referred to as a voltomogramm, is then stored for future use or for comparison to voltomogramms for known gases or combinations of gases. An example of a voltomogramm, taken from FIG. 4 of U.S. Pat. No. 5,772,863 (showing a voltomogramm for carbon monoxide) is shown in FIG. 6.

Additional methodology, available under license from Argonne National Laboratories in connection with a license of suitable sensors 200, is used to compare the voltomogramms generated by sensor 200 (in connection with the $DA^2$ software) with the voltomogramms of known gases or combinations thereof. This methodology includes a neural net module. The neural net module is treated as function called up by processor 300 and the $DA^2$ software. The neural net module analyzes the data which is characteristic of a sampled representation of the gas signature. The neural net module can be trained to recognize particular gas patterns as noted in Columns 7, line 58 through Column 8 line 23 of U.S. Pat. No. 5,429,727 already incorporated herein by reference. Using the neural net module, processor 300 compares the voltomogramms generated by sensor 200 and compares them to voltomogramms of known gases or combinations thereof programmed into the neural net module. If a substantial match is made, the presence of the matched gas has likely been detected by sensor 200.

FIGS. 2a and 2b demonstrate the electrical diagram of sensor 200. The voltage is varied using the $DA^2$ software and accompanying variable power source 240. Voltmeter 230 measures voltage applied across reactive area 201. An ammeter 210 measures the current passing out of reactive area 201. Preferably, ammeter 210 is constructed such as that denoted as 220 in FIG. 2a. Ammeter 220 comprises a voltmeter 222 applied across a resistor 221 having a known resistance so that the corresponding current may be properly measured as a function of the applied voltage.

When processor 300 determines that termite gases are present, a suitable signal is relayed to output device 400. Output device 400 includes visual output, such as a computer screen (in connection with the $DA^2$ software) or indicator lights, audible output, such as an appropriate audio alarm to alert a user that termite gases have been detected. Other suitable output devices 400 include LED displays or liquid crystal displays.

Figure 3B:
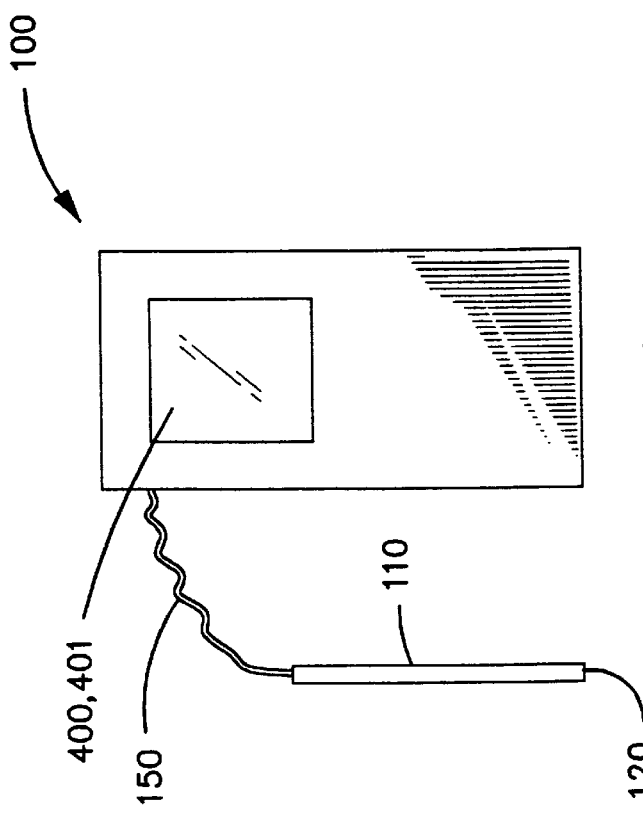
FIG. 3b illustrates a second embodiment of the invention.
Figure 3A:
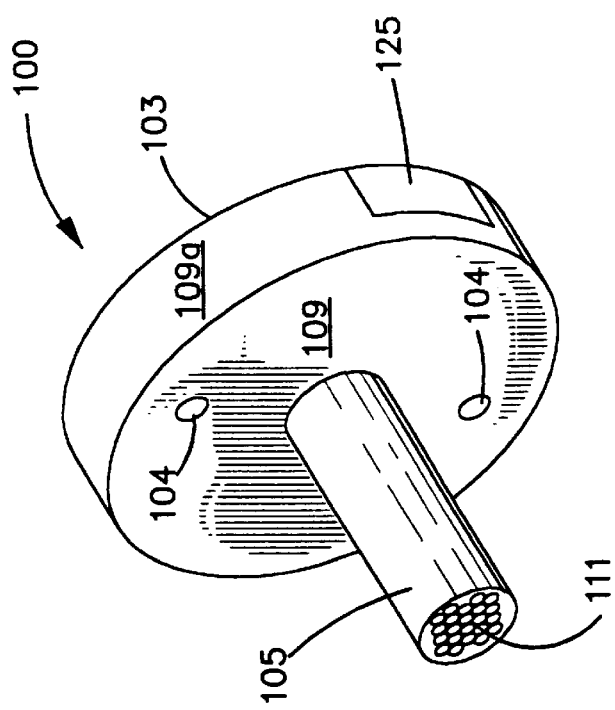
FIG. 3a illustrates a first embodiment of the invention.

One embodiment of the present invention 100 is shown in FIGS. 3a and 4b positionable within the walls 101 of an existing structure so that sensor 200 fluidly communicates with the open space between walls 101. Viewing FIG. 4b, invention 100 generally comprises a housing 103 mounted onto the surface of wall 101 so that housing 103 covers the insertion point wand 105. Housing 103 may be positioned on screws 113 in wall 101 using mounts 104 which are positioned on or within sensor side 109. Sensor side 109 faces the wall to which invention 100 is mounted. A sidewall 109a extends between side 109 and side 118. Housing 103 preferably encases processor 300 and is adapted to allow output device 400 to alert users when termites have been detected.

A cover 125 is removably attached to housing 103. Cover 125 allows access to batteries (9-volt, AA or other conventional batteries), which are used to power the embodiments shown in FIGS. 3a and 3b.

Sensor wand 105 extends from side 109 and is configured in the shape of a tubular member. Viewing FIG. 3a, wand 105 has a perforated end 111 so that sensor 200 (not shown), which is positioned within wand 105, is not damaged during insertion. End 111 is perforated so that the sensor 200 may fluidly communicate with the interior area 112 existing between walls 101 so that sensor 200 can detect the presence of termite gases. In a preferred embodiment, wand 105 is preferably about 4–8 inches, more preferably 6 inches long and has an outside diameter of between about ¼ and about ¾ inches, more preferably about ⅜ inches. Sensors 200 (and/or wand 105) is positioned so that it is in fluid communication with and/or positionable within an area infestable by termites.

Housing 103 is preferably small and lightweight so that its easily mounts onto an existing wall 101 and covers insertion point 114 as shown in FIG. 3a. Housing 103 encases processor 200 and output device 400, which preferably comprises an audible alert or visual alert such as blinking red light indicating the presence of termite gases. Other suitable output devices 400 such as those described herein can be incorporated so that the output is viewable by a user along first side 118.

Another embodiment of the invention 100 is shown in FIG. 3b. This embodiment is mobile and may be used by pest control operators. The embodiment shown generally comprises a wand 110, which houses sensor 200 (not shown) and has a perforated end 120 (such as perforated end 111 previously described) a processor 300 and an output device 400, such as an visual (LED) display 401. An expandable cord 150 may connect wand 110 and processor 300. Perforated end 120 is insertable into the interior area 112 of walls 101 as shown in FIG. 4b.

The present invention 100 may be constructed so that sensor 200 continuously monitors gases. Alternatively, processor 300 may be programmed to cause sensor 200 to take measurements at pre-determined or programmable desired time intervals. In the embodiments shown in FIGS. 3a, 3b, 4a, and 4b, processors 300 can be preprogrammed with computer code similar or the same as the DA2 software and the ANL methodology.

As used in the claims, "operative communication" is meant to include both direct communication by wire or other means and indirect communication, such as by remote radio and/or infrared transmitters and receivers so that the sensor, processor and output device are appropriately interfaced.

Although the preferred embodiment has been described, it will be appreciated by those skilled in the art to which the present invention pertains that modifications, changes, and improvements may be made without departing from the spirit of the invention defined by the claims.

What is claimed is:

1. A termite detection apparatus comprising:
   (a) a sensor adapted to be in communication with and positionable within an area infestible by termites, said sensor having a reactive area responsive to gases emitted by termites, said sensor producing an output signal responsive to the presence of gases contacting a reactive area of said sensor, said sensor in operative communication with a processor;
   (b) a processor in operative communication with said sensor,
   (c.) a plurality of predetermined sensor responses, each said pre-determined sensor response representing the output signal of said sensor in response to reaction with one or more gases known to be emitted by termites whereby said processor compares said output signal to to said pre-determined sensor responses to determine if termites are present; and
   (d.) an output device in operative communication with said processor, said output device adapted to generate an alert signal to a user when said processor detects the presence of one or more gases know to be emitted by termites through said comparison of said output signal with said pre-determined sensor responses, said alert signal being generated independently of ambient background environmental conditions.

2. The apparatus according to claim 1 wherein said sensor is adapted to be positionable within the wall of an existing structure.

3. The apparatus according to claim 1 wherein said sensor is adapted to be in fluid communication with the open space of a wall of an existing structure.

4. The apparatus according to claim 1 wherein said processor is selected from the group consisting of a microprocessor or a computer.

5. The apparatus according to claim 3 wherein said sensor comprises an electrocatalytic cermet gas sensor.

6. The apparatus according to claim 5 wherein said output device comprises an visual display.

7. The apparatus according to claim 5 wherein said output device comprises an audible indicator.

8. The apparatus according to claim 5 further comprising a housing, said processor positionable at least partially within said housing.

9. The apparatus according to claim 8 wherein said housing is mountable to a surface.

10. The apparatus according to claim 8 further comprising a wand, said wand having said sensor positioned therein.

11. The apparatus according to claim 9 wherein said housing is mountable to the surface of a wall so as to cover the point of insertion of said wand.

12. The apparatus according to claim 10 wherein said wand comprises a tubular member formed by at least one sidewall, said sensor positionable within said tubular member, said wand configured to allow fluid communication between the exterior of said wand and said sensor.

13. A method for detecting the presence of termites comprising:
   providing a termite detection apparatus comprising a sensor positionable in an area infestable by termites, said sensor having a reactive area responsive to gases that contact said reactive area;
   passing an electrical current through said reactive area of said sensor; generating a response from said sensor; providing a plurality of pre-determined sensor responses, each sensor response representing an output signal of said sensor in response to reaction of a gas or combination of gases known to be emitted by termites;
   comparing said response to said pre-determined sensor responses; and,
   outputting the results of said comparison step to a user, wherein said results are being generated independently of ambient background environmental conditions.

14. The method according to claim 13 wherein said sensor is adapted to be positionable within the wall of an existing structure.

15. The method according to claim 13 wherein said sensor is adapted to be in fluid communication with the open space of a wall of an existing structure.

16. The method according to claim 13 comprising the step of positioning said sensor within the wall of an existing structure.

17. The method according to claim 13 wherein said termite detection apparatus further comprises:

(a) a processor in operative communication with said sensor, whereby said processor analyzes said output to determine if said sensor has detected one or more gases known to be emitted by termites; and, (b) an output device in operative communication with said processor, said output device adapted to generate an alert signal to a user when said processor detects the presence of one or more gases known to be emitted by termites.

* * * * *